United States Patent Office 2,811,558
Patented Oct. 29, 1957

2,811,558

PREPARATION OF 2-METHYL 1:3-CYCLO-PENTANE-DIONE

Charles Sannie and Jacques Joseph Panouse, Paris, France, assignors to Societe des Usines Chimiques Rhone-Poulenc, Paris, France, a French body corporate No Drawing. Application December 22, 1955,
Serial No. 554,630

Claims priority, application France January 6, 1955

8 Claims. (Cl. 260—586)

This invention is for improvements in or relating to cyclopentane derivatives and to processes for the preparation of such compounds. More particularly, this invention concerns the provision of intermediates of value in the synthesis of steroid compounds.

It is the object of the present invention to provide a new and industrially important process for the production of 2-methyl-cyclopentane-1:3-dione, which, as is known, is a valuable intermediate for use in the synthesis of steroid compounds.

2-methylcyclopentane-1:3-dione was isolated for the first time by Cornforth & Earl (J. Chem. Soc., 1940, 1443) from degradation products of sarcostine; it was subsequently prepared by Orchin & Butz [J. Amer. Chem. Soc., 65, 2296 (1943)], by hydrogenating an ethanolic solution of 3-methyl-cyclopentane-1:2:4-trione monohydrate in the presence of Adams platinum catalyst. This reaction gives only a 15% yield of 2-methylcyclopentane-1:3-dione which, moreover, is obtained together with a much larger quantity of 4-hydroxy-2-methylcyclopentane-1:3-dione from which it must be separated.

According to the present invention, it has now been found that 2-methylcyclopentane-1:3-dione can be obtained in good yield by a process which comprises reacting 3-methylcyclopentane-1:2:4-trione with a compound R—NH—NH$_2$ (wherein R represents a hydrogen atom or one of the groups CONH$_2$ and CSNH$_2$), decomposing the product of reaction by heating it in a solution of caustic alkali in a solvent having a boiling point of at least 170° C. at atmospheric pressure and acidifying the alkali metal salt thus formed.

In the first stage of the reaction, the compound R—NH—NH$_2$ reacts selectively with the 1-carbonyl group so as to replace the oxygen atom therein by the =N—NHR group. The series of reactions can be represented as follows:

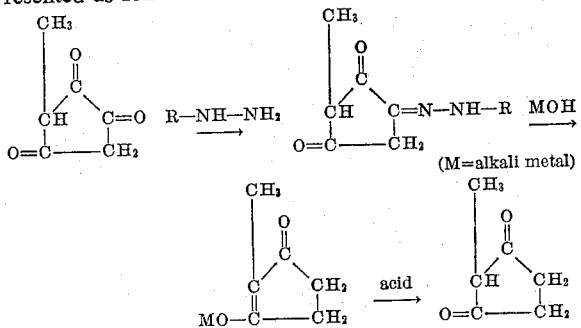

(M=alkali metal)

The 3-methylcyclopentane-1:2:4-trione used as starting material in the aforesaid reaction can readily be prepared in accordance with O. Diels, S. Sielisch and E. Muller [Ber. dtsch. chem. Ges, 39, 1328 (1906)] by condensation of diethyl oxalate with methylethyl ketone in the presence of sodium. The glyoxylate intermediately formed in the reaction is hydrolysed by an acid and gives monohydrated 3-methylcyclopentane-1:2:4-trione (see also Orchin and Butz, loc. cit.).

The compound R—NH—NH$_2$ may be employed as such or in the form of a salt, according to the specific nature of the radical R. In the case of hydrazine (R=H) the hydrate is conveniently used; semicarbazide (R=CONH$_2$) and thiosemicarbazide (R=CSNH$_2$) are normally available in the form of their salts. The solvent in which the hydrazone or semicarbazone reaction product of the first stage is decomposed, is preferably a dihydric alcohol having the requisite boiling point characteristics, for example, ethylene glycol, a propanediol or a butanediol. The decomposition is preferably carried out at or near the boiling temperature of the reaction mixture.

The aforesaid process may be performed in a single operation by simultaneously heating the trione, the compound R—NH—NH$_2$, the caustic alkali and the solvent, and this method of operation is applicable especially in the case where hydrazine is employed. The hydrazone intermediate formed decomposes as it is formed.

An alternative mode of operation involving the use of hydrazine, which also gives an excellent yield, comprises adding a solution of the hydrazone intermediate in one of the chosen solvents and containing caustic alkali to a boiling solution of caustic alkali in one of the chosen solvents.

A further advantageous method of operation involving the use of semicarbazide in the form of its hydrochloride as the compound R—NH—NH$_2$, comprises reacting the semicarbazide in the cold with the trione to give a mono-semicarbazone. The latter is isolated and then heated with caustic alkali dissolved in one of the chosen solvents preferably at the boiling point of the reaction mixture. This method of operation gives high yields in each of the two successive stages, so that the overall yield is still excellent.

The following examples illustrate the invention; except where otherwise indicated, the parts stated are by weight and the ratio of the parts by volume to the parts by weight is as cubic centimetres to grammes.

*Example I*

280 parts of monohydrated 3-methylcyclopentane-1:2:4-trione are dissolved in the cold in 2000 parts by volume of 95% (by volume) ethyl alcohol. 2000 parts of water are added, followed by a solution of 220 parts of semicarbazide hydrochloride and 300 parts of crystalline sodium acetate in 2000 parts of water. The 1-mono-semicarbazone derivative of the 3-methylcyclopentane-1:2:4-trione precipitates. It is filtered off and dried in vacuo (330 parts).

150 parts of this semi-carbazone are introduced into 1500 parts by volume of ethylene glycol, in which 150 parts of potassium hydroxide have been dissolved. The mixture is heated under reflux (150° C. in the bath), and an abundant evolution of nitrogen and ammonia occurs, and the reaction medium turns slightly brown. The product is heated for 14 hours between 170° and 200° C., whereafter almost all the glycol is driven off by distillation in vacuo. The product is allowed to cool, taken up in water and acidified to a pH value of 7 by the addition of concentrated hydrochloric acid, and then to a pH value of 3 by means of dilute hydrochloric acid. Separation by filtration and drying of the resulting precipitate yields 85 parts of 2-methylcyclopentane-1:3-dione representing a yield of 86% based on the 3-methylcyclopentane-1:2:4-trione initially introduced. The product recrystallised from boiling water melts at 214–215° C. (Kofler bench).

*Example II*

280 parts of monohydrated 3-methylcyclopentane-1:2:4-trione are dissolved in the cold in 2000 parts by volume of 95% ethyl alcohol. There are then successively added 1000 parts of water and a solution of 242 parts of semicarbazide hydrochloride and 300 parts of crystalline sodium acetate in 2000 parts of water. The semicarbazone which precipitates is filtered off and dried at 100° C. (314 parts).

64 parts of this semicarbazone are introduced into a solution of 64 parts of potassium hydroxide in 640 parts by volume of technical ethylene glycol and the mixture is heated under reflux for 5 hours on an oil bath heated to 180–195° C. A violent evolution of gas occurs at about 180° C. The glycol is thereafter driven off by distillation in vacuo (pressure 13 mm. Hg) by progressively raising the temperature of the bath from 130° to 200° C. The residue is taken up in 200 parts of water and brought to a pH value of 3 by the addition of concentrated hydrochloric acid. The resulting precipitate is filtered off, washed with water and dried. 31.7 parts of 2-methylcyclopentane-1:3-dione are thus obtained, this substance melting at 210° C. after recrystallisation from boiling water.

*Example III*

294 parts of semicarbazone obtained as in Example II are heated for 5 hours at 170–172° C. in 3200 parts by volume of anhydrous ethylene glycol to which 294 parts of potassium hydroxide have been added. The evolution of gas, which is at first significant, ceases rapidly. The glycol is distilled off in vacuo, and the residue is taken up in water and acidified to a pH value of 3 by means of concentrated hydrochloric acid.

The 2-methylcyclopentane-1:3-dione precipitate which has formed is separated by filtration, washed and dried to a constant weight (133 parts). A further quantity of 5 parts of dione can be extracted from the mother liquors and from the washing waters by concentration in vacuo and extraction with ether.

*Example IV*

14 parts of monohydrated 3-methylcyclopentane-1:2:4-trione are poured into a solution of 19 parts of potassium hydroxide and 17 parts by volume of 67% hydrazine hydrate in 150 parts of ethylene glycol, contained in an apparatus on which is mounted an automatic water separator and a reflux condenser. The mixture is heated on an oil bath at 170° C. An evolution of gas takes place at about 130° C. (temperature of the bath), and becomes more abundant at 170° C. The temperature of the bath is then raised to 195–205° C. and heating is continued for 8 hours in all. The glycol partly distils off carrying with it the water and the excess of hydrazine hydrate. The remainder of the glycol is then removed by distillation in vacuo. The residue is taken up in 200 parts of water and acidified to a pH value of 3 by means of concentrated hydrochloric acid. The solution thus obtained is continuously extracted with ether. 3 parts of 2-methylcyclopentane-1:3-dione can be isolated from the ethereal extract.

*Example V*

An alkaline glycolic solution of hydrazone of 3-methylcyclopentane-1:2:4-trione is prepared from:

Solution A:                              Parts

Monohydrated trione _____ 9
    Technical ethylene glycol (by volume) _____ 35
    98% hydrazine hydrate _____ 3.7
    Potassium hydroxide _____ 3.5

On the other hand, a solution of:

Solution B:                              Parts

Potassium hydroxide _____ 3.5
    Technical ethylene glycol (by volume) _____ 70 is heated to boiling under reflux.

Solution A is run into solution B, the steam being condensed as it is formed with the aid of an automatic water separator. At the end of the reaction, the glycol is removed by distillation in vacuo. The pale brown pulverous residue is taken up in water (50 parts) and the resultant solution is acidified with hydrochloric acid to a pH value of 2. The 2-methylcyclopentane-1:3-dione precipitates immediately. It is filtered off and dried in vacuo. 4.5 parts of product melting at 214° C. are obtained, which can be purified by simple recrystallisation from boiling water.

We claim:

1. A process for the preparation of 2-methylcyclopentane-1:3-dione which comprises reacting 3-methylcyclopentane-1:2:4-trione with a substantially equimolecular quantity of a compound R—NH—NH$_2$ (wherein R represents a member of the class consisting of hydrogen and the groups CONH$_2$ and CSNH$_2$), decomposing the product of reaction by heating it in a solution of caustic alkali in a solvent having a boiling point of at least 170° C. at atmospheric pressure and acidifying the alkali metal salt thus formed.

2. A process for the preparation of 2-methylcyclopentane-1:3-dione which comprises reacting 3-methylcyclopentane-1:2:4-trione with a substantially equimolecular quantity of hydrazine hydrate, decomposing the product of reaction by heating it in a solution of caustic alkali in a solvent having a boiling point of at least 170° C. at atmospheric pressure and acidifying the alkali metal salt thus formed.

3. A process according to claim 2, wherein a reaction mixture containing said trione, hydrazine hydrate, caustic alkali and said solvent is heated to boiling until the reaction is completed.

4. A process according to claim 2, wherein a solution in said solvent of the reaction product of said trione and hydrazine hydrate containing caustic alkali, is added to a solution in said solvent of caustic alkali maintained at boiling point.

5. A process for the preparation of 2-methylcyclopentane-1:3-dione which comprises reacting 3-methylcyclopentane-1:2:4-trione with a substantially equimolecular quantity of semicarbazide salt, decomposing the product of reaction by heating it in a solution of caustic alkali in a solvent having a boiling point of at least 170° C. at atmospheric pressure and acidifying the alkali metal salt thus formed.

6. A process according to claim 5, wherein a semicarbazide salt is reacted in the cold with said trione, the thus formed monosemicarbazone is isolated and is thereafter heated with a caustic alkali in said solvent at the boiling point.

7. A process for the preparation of 2-methylcyclopentane-1:3-dione which comprises reacting 3-methylcyclopentane-1:2:4-trione with a substantially equimolecular quantity of a thiosemicarbazide salt, decomposing the product of reaction by heating it in a solution of caustic alkali in a solvent having a boiling point of at least 170° C. at atmospheric pressure and acidifying the alkali metal salt thus formed.

8. A process for the preparation of 2-methylcyclopentane-1:3-dione, which comprises forming a solution of 3-methylcyclopentane-1:2:4-trione with a substantially equimolecular quantity of a substance chosen from the group consisting of hydrazine hydrate, semicarbazide salts and thiosemicarbazide salts, in a solvent selected from the class consisting of ethylene glycol, propane diols and butane diols, and containing potassium hydroxide, adding that solution to a solution of potassium hydroxide in said solvent heated to boiling under reflux, continuing said heating under reflux until completion of reaction, separating from residual solvent the alkali metal salt thus formed, forming an aqueous acid solution of said alkali metal salt and separating the 2-methylcyclopentane-1:3-dione thereby precipitated.

References Cited in the file of this patent

Huang-Minlon: J. Am. Chem. Soc. 68, 2487–8 (1946).